US006517954B1

(12) United States Patent
Mergen et al.

(10) Patent No.: US 6,517,954 B1
(45) Date of Patent: Feb. 11, 2003

(54) ALUMINIUM ALLOY, NOTABLY FOR A LAYER

(75) Inventors: Robert Mergen, Wels (AT); Markus Manner, Mauer (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 09/719,191

(22) PCT Filed: Jul. 27, 1999

(86) PCT No.: PCT/AT99/00187

§ 371 (c)(1),
(2), (4) Date: Dec. 8, 2000

(87) PCT Pub. No.: WO00/06787

PCT Pub. Date: Feb. 10, 2000

(30) Foreign Application Priority Data

Jul. 29, 1998 (AT) .............................................. 1302/98

(51) Int. Cl.$^7$ .......................... B32B 15/20; C22C 21/00; C22F 1/04

(52) U.S. Cl. .......................... 428/653; 148/531; 148/534; 148/535; 148/437; 384/445; 384/907; 384/912; 420/528; 420/530; 420/540; 420/543; 420/548; 420/551; 420/552; 420/554; 428/654; 428/908.8; 428/936; 428/937; 428/938; 428/939

(58) Field of Search ................................. 428/653, 654, 428/908.8, 936, 937, 938, 939; 384/445, 907, 912; 148/531, 534, 535, 437; 420/528, 530, 540, 543, 548, 551, 552, 554

(56) References Cited

U.S. PATENT DOCUMENTS

| 3,619,181 A | 11/1971 | Willey |
| 4,471,032 A | * 9/1984 | Fukuoka et al. ............ 428/653 |
| 4,816,087 A | 3/1989 | Cho |
| 4,857,267 A | 8/1989 | Maki et al. |
| 4,874,440 A | 10/1989 | Sawtell et al. |
| 5,055,257 A | 10/1991 | Chakrabarti et al. |
| 5,075,177 A | * 12/1991 | Tanaka et al. ............... 428/653 |
| 5,226,983 A | 7/1993 | Skinner et al. |
| 5,620,652 A | 4/1997 | Tack et al. |

FOREIGN PATENT DOCUMENTS

| DE | 30 00 772 | 7/1981 |
| DE | 30 00 773 | 7/1981 |
| DE | 40 04 703 | 9/1990 |
| DE | 42 31 862 | 4/1993 |
| DE | 43 32 433 | 5/1994 |
| EP | 158 769 | 10/1985 |
| EP | 0 353 773 | 2/1990 |
| GB | 597 113 | 1/1948 |
| GB | 623486 | 5/1949 |
| JP | 52072312 | 6/1977 |

(List continued on next page.)

OTHER PUBLICATIONS

The 4$^{th}$ International Conference on Aluminum Alloys, "The Effect of Scandium on the Age–Hardening Behavior of An Al–Cu Alloy", Masaru Nakayama, pp. 538–545, (no date).

(List continued on next page.)

Primary Examiner—Robert R. Koehler

(57) ABSTRACT

The invention relates to an aluminium alloy, in particular for a layer of a friction bearing, for example, which, apart from aluminium and smelt-related impurities, additionally contains soft-phase formers, e.g. Sn, Pb, Bi, Sb or similar. The alloy contains added quantities of at least one element from the group of elements consisting of Sc, Y, Hf, Nb, Ta, La, lanthanides and actinides in a maximum of 10% by weight, preferably 4% by weight, in particular between 0.015% by weight and 3.25% by weight, relative to 100% by weight of alloy, the remainder being aluminium with smelt-related impurities.

29 Claims, 3 Drawing Sheets

FOREIGN PATENT DOCUMENTS

| | | |
|---|---|---|
| JP | 52072313 | 6/1977 |
| JP | 61012844 | 1/1986 |
| WO | WO 96/10099 | 4/1996 |
| WO | WO-96/10099 A1 * | 4/1996 |
| WO | WO 97/22725 | 6/1997 |

OTHER PUBLICATIONS

The 3$^{rd}$ International Conference on Aluminum Alloys, "The Aging Behavior and Tensile Properties of Al–Sc Alloy", C. Tan, Z. Zheng and B. Wang, pp. 290–294, (no date).

JP62224722, Japanese Abstract, p. 1, Nov. 1987.

JP91079023, Japanese Abstract, "Material for Brearing" pp. 126–130, Apr. 4, 1986.

Sawtell et al, "Dispersion Strengthened Aluminium Alloys, The Minerals, Metals & Material Society", 1988, pp. 409–420 (no month given).

Vetrano et al, "Materials, Science and Engineering", A 238, 1997, 101 to 107. (no month given).

* cited by examiner

ALUMINIUM ALLOY, NOTABLY FOR A LAYER

REFERENCE TO RELATED APPLICATIONS

Applicants claim priority under 35 U.S.C §119 of Austrian Application No. A1302/98 filed Jul. 29, 1998. Applicants also claim priority under 35 U.S.C. §365 of PCT/AT99/00187 filed on Jul. 27, 1999. The international application under PCT article 21 (2) was not published in English.

The invention relates to a wrought aluminium alloy for a layer of a friction bearing which, apart from impurities inherent in the smelt, additionally contains Sn, Pb, Bi and Sb as soft-phase formers, as well as a multi-layered material made therefrom and a method of producing multi-layered materials incorporating at least one such aluminium alloy.

In order to avoid the disadvantages of lower resistance to fatigue inherent in aluminium-tin alloys containing silicon when used in plain bearings due to the notching effect of the silicon particles on the one hand and the cutting effect of the silicon particles in the region of the friction surface on the other, it is common practice to dispense with silicon when introducing alloying elements. One of the methods proposed (DE 4231 862 A1) as a means of improving the mechanical properties of silicon-free aluminium alloys with a high tin content, in the region of 35% by weight to 65% by weight, is to introduce lead and bismuth in a quantity of 0.5% by weight to 1.0% by weight in total on the one hand and at least one of the elements manganese, nickel, silver, magnesium, antimony and zinc on the other in a total quantity of at most 5% by weight. Because of the high tin content, as the smelt sets to an alloy, a cohesive tin network forms, which has a considerable adverse effect on the structural strength of the bearing material and its deformability, which is crucial with regard to the standard plating of these cast alloys with steel and the associated moulding steps. Furthermore, the higher the tin content is, the greater the effect the network structure of the tin in the aluminium matrix has on the mechanical properties of the material used for the plain bearing.

Aluminium alloys with a high tin content are also known from other publications. DE 4004703 A1, for example, discloses a coating material for bearing elements with an aluminium-based anti-friction coating. In addition to the usual permissible impurities, it contains added quantities of 1% by weight to 3% by weight of nickel, 0.5% by weight to 2.5% by weight of manganese and 0.02% to 1.5% by weight of copper. The tin content is 0.5% by weight to 20% by weight. This composition produces a tin phase in the form of dispersed tin particles in a matrix of an AlNiMnCi crystal mixture alongside rolled-in hard particles. The added tin is intended to produce a friction-type bearing element which has as smooth as possible a running action, even at higher speeds, reduced friction and improved resistance to galling. However, this publication points out that if necessary, the added tin can be replaced by lead in a quantity of between 1% by weight and 10% by weight, which specifically rules out the use of an aluminium alloy of this type with an added high tin content in friction-type bearings for high-performance motors, due to the poor distribution of the tin phase.

A multiple-layer friction-type bearing having a coating of an aluminium-tin bearing alloy with a tin content of from 7% by weight to 20% by weight is known from DE 43 32 433 A1. Here, however, it is pointed out that the mechanical properties of the bearing alloy are adversely affected if the tin content is in excess of 20% by weight and a bearing alloy of this type cannot be used under tough conditions, for example in the case of a higher-performance motor. For this reason, silicon is incorporated in the alloying elements in a quantity of up to 4% by weight.

A bearing alloy with an aluminium-tin base having 7% by weight to 35% by weight of tin is known from DE 30 00 773 A1. The introduction of additional elements into the alloy is intended to improve the fatigue strength, whilst reducing the hardness at high temperatures and in particular avoiding any coarsening of the tin particles. The intention is also to increase resistance to wear of the bearing alloy in order to improve durability with regard to a shaft to be mounted. The disadvantage is that in order to obtain these properties, the aluminium alloys must contain a higher proportion of chromium, from 0.1% by weight to 1% by weight, in order to maintain the distribution of the tin.

A bearing alloy with an aluminium base is known form U.S. Pat. No. 4,471,032 A, to which between 1.5% by weight and 35% by weight of tin is added. In addition, this alloy contains between 1% by weight and 11% by weight of at least one element from the group consisting of manganese, iron, molybdenum, nickel, zirconium, cobalt, titanium, antimony, niobium and chromium, which again means that inter-metallic hard particles are formed, these being intended to improve the durability properties of a bearing made therefrom under more difficult conditions. The proportion of these hard phases in the matrix makes use with high-performance motors more difficult, however, because the desired lubricating effect of the tin can be reduced.

WO 97/122725 A describes an aluminium alloy, which simultaneously has a high tin content and exhibits a high strength. The latter is obtained amongst other things due to the formation of inter-metallic phases, which make the aluminium matrix more solid. The composition is selected so that the inter-metallic precipitations do not have a negative effect on the matrix strength. Furthermore, the specific wetting behaviour of these precipitations with the tin helps to improve the structural strength—because the matrix structure is only negligibly disrupted by the tin network.

One aspect of this solution, the use of very little aluminium in soluble formers of inter-metallic phases, does however have a disadvantage in that no use is made of the potential hardening effects or the hardening effect which can be obtained is reproducible within only rather broad margins.

Accordingly, the underlying objective of the invention is to provide an aluminium alloy whose structural strength and mechanical properties can be improved, even in the presence of higher tin contents.

This objective is achieved by adding a quantity of at least to the first-described aluminium alloy. Wrought aluminium alloy for a layer in a friction bearing which, apart from impurities inherent in the smelt, additionally contains Sn, Pb, Bi, Sb as soft-phase formers, and a quantity of at least one element from the group of elements consisting of Sc, Y, Hf, Ta, La, lanthanides and actinides up to a maximum of 10% by weight, said quantity forming intermetallic $A_3M$ phases with the aluminium, said $A_3M$ phases being an average diameter of 0.005 µm to 5 µm. The advantage here is that it produces an Al-alloy which does not exhibit any marked hardening behaviour whilst exhibiting a high ductility due to the finely dispersed distribution of $A_3M$-phases and that, in spite of the breakdown of solidified materials occurring during the manufacturing process due to heat treatments, high values of mechanical strength can be preserved. As a results a product can be produced which exhibits good thermal, static and dynamic stability. Another advantage is the fact that this Al-alloy or the material used to produce it, may have a high recrystallisation temperature, which means that heat treatments or deformation princesses can be performed at increased temperatures without giving rise to an undesirable reduction in hardness and so that friction-type bearings, for example, will also be capable of withstanding higher temperatures such as occur with new types of bearing elements with high-speed rotary shafts, for example. Yet another advantage is that because of the possibility of using multiple combinations of individual elements of the specified group material characteristic can be freely adjusted within specific limits, thereby enabling the inherent cost of producing the Al-alloy to be controlled accordingly. On the other hand, however, being able to introduce radioactive elements or isotopes such as $U_{235}$ into the alloy simultaneously means that tracers can be incorporated in the alloy for test purposes so as to monitor the behaviour of the material on different test machines.

By adding Li, Zn, Si, Mg, Mn, Cu, Be, Ca, Zr, Mo, W, Ag, Ti, V, Cr, Fe, Co, Ni, Pd, Au, Pt, In, Ge, Sn, Pb, Sb, Bi and Te, or as a result of the large number of possible combinations, particularly when using the Al-alloy as an anti-friction layer for a bearing, the alloy can be readily adapted to specific requirements, in particular to the properties of the layers comprising the friction bearing. The effects which can be achieved by introducing the elements specified in these claims into the alloy can be taken from the detailed description below.

Advantageously, the Al-alloy for a layer in friction bearings, in addition to the requisite hardness, also contains up to 50% by weight of soft-phase formers dispersed in the Al matrix. Due t the elements of the Pb, Bi, Sb group, it is possible to act on the tension at the interface boundary of the tin so that when the Al-matrix hardens the tin can not precipitate on the grain boundaries of the matrix as a cohesive network. Interrupting the network structure of the soft phases, in particular the tin phase, brings about a change in the pattern structure, increasing the structural strength of the Al-alloy accordingly and improving deformability.

An Al-alloy with a high proportion of volume of soft phases and a desirable hardness, permitting its use in motors with high-speed rotating shafts and without premature fatigue, can be produced with an alloy whose hardness value after massive forming is no more than 35% below that value measured prior to a heat treatment for a period of 0.5 to 48 hours and at a temperature between 85° C. and 445° C., or 70% to 80% below that value measured prior to a heat treatment for a period of 1 to 24 hours and at a temperature between 100° C. and 350° C. The alloy has a preferred Vickers hardness between 25 HV2 and 80 HV2.

An advantageous multi-layered material for friction bearings, comprising at least two layers of differing compositions, in which the hardness of the layers is different and increases from a first peripheral layer to a second peripheral layer lying opposite it, has at least one of the peripheral layers made from the Al-alloy of this invention. The advantage of this is that due to the layout of the Al-alloy, multi-layered materials made from layers of a different composition, for friction bearings for example, can be produced such that their service life can be extended due to the improved mechanical properties or quality of the multi-layered material. As a result, the periods between any maintenance needed can be increased and, if the multi-layered material is used in a bearing application, the shafts supported thereby can be operated for a longer period without the worry of damage to the surface of these shafts due to inadvertent friction forces.

The objective of the invention is also achieved by a method of producing the above-indicated multi-layered material for friction bearings, wherein at least the first peripheral layer is joined to an intermediate supporting layer.

If the previously hardened first peripheral layer is rolled with at least one other Al base alloy, which may optionally contain other alloying elements or no soft-formers, the quality of the bond can be improved since the inherent properties are those of the aluminium base having several layers.

Undesirable tension that have built up can be released after each or several massive forming step(s) if the Al-based alloy(s) or multi-layered material is/are tempered after every overall forming process by at least 25% and at most 91% in one or more forming steps at a temperature in the range of between 85° C. and 445° C.

In order to provide a clearer understanding, the invention will be described in more detail below with reference to the appended drawings.

Of these:

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, individual features or combinations of features from the different embodiments illustrated and described may be construed as independent inventive solutions or solutions proposed by the invention in their own right.

Figure 1:
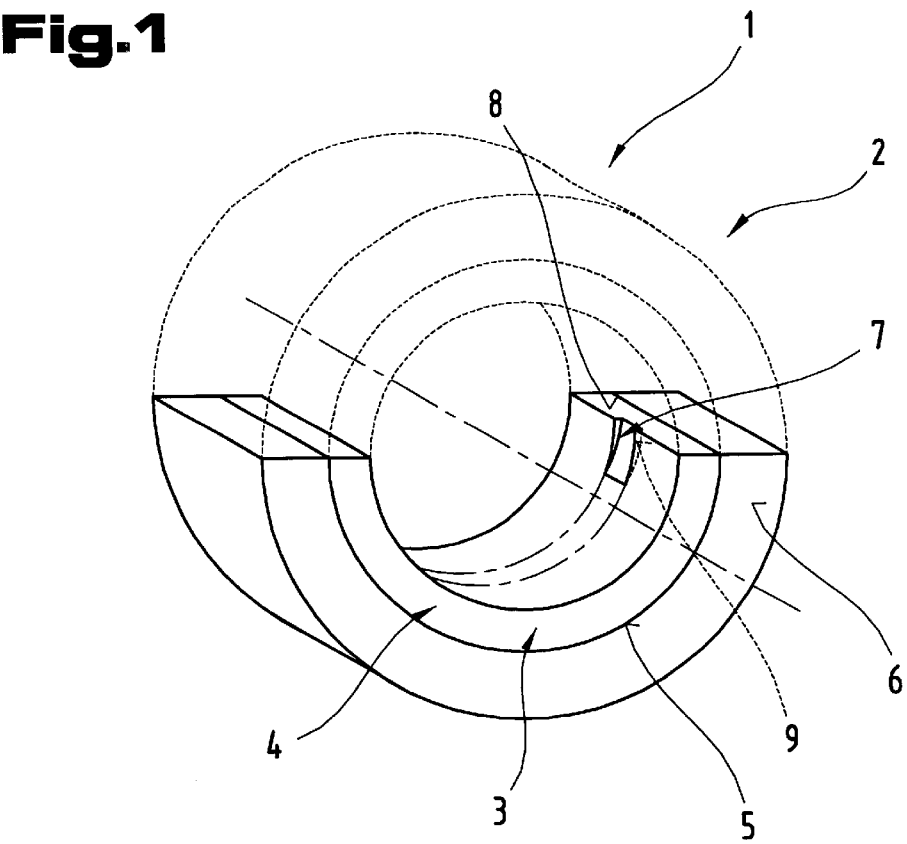
FIG. 1 is a friction bearing as proposed by the invention with a two-layered structure and designed as a half shell.

FIG. 1 illustrates a bearing member 1, for example a friction bearing 2, the anti-friction layer 3 of which is made from an aluminium alloy 4 as proposed by the invention. A surface 5 of the anti-friction layer is coated with a supporting layer 6, which is conventionally a metal material such as steel for example, and at least a part of which is intended to absorb the forces transmitted by a shaft to the anti-friction layer 3.

As may be seen from FIG. 1, the bearing member 1 is designed as a half-shell. Clearly, however, full-shell variants made from the aluminium-based alloy proposed by the invention may also be used, as shown by the broken lines in FIG. 1.

Bearing members 1 of this type are generally used to support rotary components, e.g. shafts for machines, motors, etc. Since these shafts are normally operated at high rotation speeds—with the exception of the run-up and shut-down phase—it is necessary to prevent driving friction on the bearing and shaft. One possible way of doing this, apart from designing the anti-friction layer 3 as an aluminium alloy with a high proportion of soft phase, e.g. Sn, Bi, Pb, Sb or similar, is to provide a groove 7 in the anti-friction layer 3, in which an appropriate lubricant such as oil can be placed and guided. This groove 7 may either be provided in the form of a groove at a certain point of the surface having side walls 9 which become wider in the direction of an end face 8 or alternatively as a circumferential groove, as illustrated by the dotted-dashed lines of FIG. 1. Clearly, there are other possible ways of introducing lubricants, e.g. by end-to-end bores.

Another possible approach is one in which at least one of the edges of the anti-friction layer 3 lying opposite the surface 5 is interrupted, which will enable undesirable solid particles to be fed away to the side, for example.

The anti-friction layer 3 may be joined to the supporting layer 6 to prevent movement, e.g. by plating, rolling, welding, bonding, clamping, etc., in order to ensure that the load will be reliably transferred. In choosing the bonding methods, it is of course necessary to take account of the high loads that will occur, due to increased temperatures amongst other things.

The groove 7 may also serve as a means of picking up any solid particles which might result from friction on the anti-friction layer 3 for example, which may optionally be carried away with the lubricant. As a result, this takes the load off the anti-friction layer 3, which may also be used to embed foreign particles due to its ductility, thereby extending the service life of the anti-friction layer 3 and hence the friction bearing 2 as a whole.

The aluminium alloy 4, in particular the anti-friction layer 3, may contain added quantities of scandium (Sc) in a maximum of 10% by weight, preferably 4% by weight and in particular between 0.015% by weight and 3.25% by weight. All the specified quantities given here for the composition of alloys should be understood as proportions by weight relative to 100% by weight of the total alloy.

It has also proved to be of advantage if the scandium is incorporated in the aluminium alloy 4 in a quantity of between 0.015% by weight and 2.5% by weight or 0.015% by weight and 1.0% by weight.

In addition to Sc, other elements may also be incorporated in the alloy as a means of adjusting or improving the properties of the aluminium alloy 4. For example, Sc may be at least partially replaced by an element from the group consisting of yttrium (Y), hafnium (Hf), niobium (Nb), tantalum (Ta) and lanthanum (La) or Sc may be at least partially replaced by at least one element from the group consisting of lanthanides, for example cerium (Ce), praseodym (Pr), neodym (Nd), promethium (Pm), samarium (Sm), europium (Eu), gaudolinium (Gd), terbium (Tb), dysprosium (Dy), holmium (Ho), erbium (Er), thulium (Tm), ytterbium (Yb) or lutetium (Lu). Alternatively, it is also possible to replace the Sc at least partially by an element from the group consisting of actinides, such as thorium (Th), protactinium (Pa), uranium (U) or similar, for example.

In addition, the aluminium alloy 4 may contain other elements for modifying the structure or for modifying its properties. For example, it would be possible to incorporate at least one element from the group consisting of lithium (Li), zinc (Zn), silicon (Si) or Magnesium (Mg) in a maximum quantity of 12% by weight of the total, preferably a maximum of 6.5% by weight and in particular a maximum of 4.2% by weight. Moreover, the aluminium alloy 4 may also contain at least one element from the group consisting of manganese (Mn), copper (Cu), beryllium (Be), calcium (Ca), zircon (Zr), molybdenum (Mo), tungsten (W) or silver (Ag) in a maximum quantity of 10% by weight of the total, preferably a maximum quantity of 5% by weight, in particular a maximum of 3% by weight. It would also be possible to incorporate at least one element from the group consisting of titanium (Ti), vanadium (V), chromium (Cr), iron (Fe), cobalt (Co) or nickel (Ni) in the aluminium alloy 4 in a maximum quantity of 10% by weight of the total, preferably a maximum of 4% by weight, in particular 1.5% by weight.

Furthermore, the aluminium alloy 4 might additionally contain at least one of the elements from the group consisting of palladium (Pd), gold (Au), platinum (Pt), indium (In), germanium (Ge), tin (Sn), lead (Pb), antimony (Sb), bismuth (Bi), tellurium (Te) in a maximum quantity of 10% by weight of the total, preferably a maximum of 6.5% by weight.

The properties of the aluminium alloy 4 can be specially adjusted to suit specific purposes by incorporating the alloying elements listed above.

Adding Sc to Al-alloys is a practice that has long been known. For example, structural materials with an aluminium base containing added quantities of scandium are known from the prior art and are primarily used in space travel and the aircraft industry. Not only are these alloys light-weight, they also exhibit the property of super-elasticity, which is mainly attributable to a highly degenerative re-crystallisation behaviour.

Aluminium-lithium alloys, for example, are known form U.S. Pat. No. 5,226,983 A, EP 0 158 769 B1 and U.S. Pat. No. 4,816,087 A, which contain a greater or lesser proportion of added quantities of scandium. The possibility of using these alloys as a structural material is primarily due to precipitations of tri-aluminides. e.g. $Al_3Li$, $Al_3Zr$ or $Al_3Sc$. $Al_3Sc$ precipitations of this type are also described in both U.S. Pat. Nos. 4,874,440 A and 5,055,257 A. They discuss the possibility of replacing the scandium partially or in full with an element from the group consisting of the lanthanides and state that, in obtaining the desired properties of the structural materials, it is important that the tri-aluminides mentioned should be contained in the aluminium matrix.

Al-alloys which contain Zr and a number of other elements in addition to Sc are known from U.S. Pat. No. 5,620,652 A. In this US patent, a plurality of possible options is described, for example for fitness equipment, structural materials for the aircraft industry, the automotive industry or for applications in the marine sector. One of the advantages is stated as being that by using these alloys in the specified applications, the mass to be displaced, in other words the weight, can bring a not inconsiderable saving on the quantity of fuel needed, whilst preserving mechanical strength.

As may be seen from the paragraphs above, these alloys have long been regarded as important, particularly in the field of structural materials. The possibility of using Al—Sc alloys of this type as multi-layered materials, however, in particular for friction bearings 2, has not been disclosed until now.

Having specifically endeavoured to seek out new possibilities of improving the quality of multi-layered materials, the applicant has now found, surprisingly, that Al—Sc alloys are especially suitable for this purpose. The fact that $Al_3Sc$ precipitations occur if Sc is incorporated in Al-alloys 4 has been found to be of advantage. This inter-metallic tri-aluminide phase crystallises with a cubic primitive structure (three-dimensional group Pm3m) and is isotypical of the $Cu_3Au$ structural type. The Sc atoms are located at the corners of the unit cell. The Al atoms assume the face-centered positions, in other words 1/2/1/2/0, 1/2/0/1/2, etc., for example. In metallic aluminium, on the other hand, the aluminium atoms are known to assume the positions in a cubic face-centred lattice. Because of the slight difference in the metal radii of Sc (162 pm, co-ordination number 12) and aluminium AL (143 pm, co-ordination number 12) (covalent bond proportions are optionally overlooked), it can be assumed that the tri-aluminide of the $Cu_3Au$ type will also assume at least an almost hypothetically cubic face-centred structure. Because, in addition, the lattice parameters of aluminium (a=0.4049 nm) and $Al_3Sc$ (a=0.4105 nm) are comparable, what are referred to as coherent phases occur, i.e. the lattice network lines of the aluminium matrix are disrupted but not interrupted. As a result, good deformability is imparted to these alloys, due to the ever present occurrence of displacements, as is the case in sliding directions along the octahedral surfaces {111} which occur with cubic face-centred crystals. Each of these slide planes in turn contains three slide directions of equal value <110>, making slip possible in 12 different sliding systems.

In addition to the good ductility of this Al—Sc material, however, another advantage is the fact that Al-alloys of this type do not exhibit any marked hardening behaviour. As a result, optimum adherence strength can be achieved between the individual layers of the multi-layered material. However, the hardness may be varied by other alloying elements, as will be described in more detail below.

Another advantage of these Al—Sc alloys is that high mechanical strength values are maintained in spite of the break-down of solidified material due to heat treatments during the production process. As a result, corresponding thermal, static and dynamic strength can be achieved in the product. The inter-metallic tri-aluminides mentioned above, for example $Al_3Sc$, are partially responsible for these properties.

Figure 2:
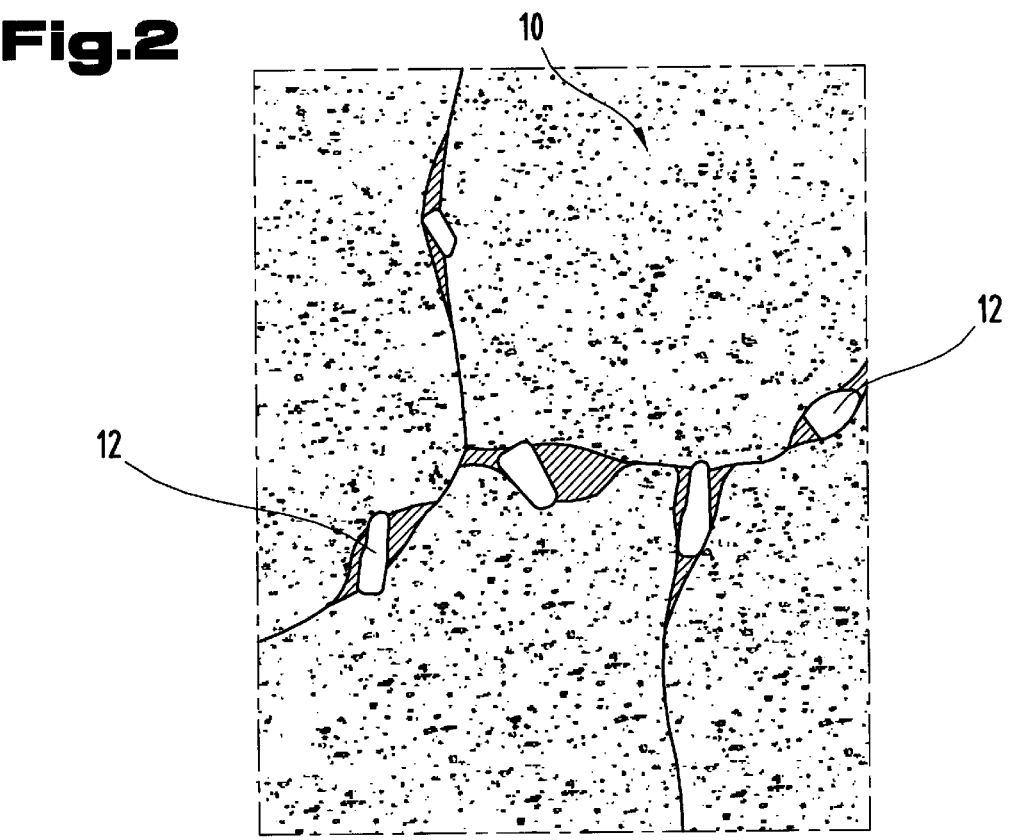
FIG. 2 is a schematic illustration of the grinding pattern of an Al-alloy proposed by the invention.

FIG. 2 illustrates one of the possible Al—Sc alloys, in which tin is incorporated as a soft-phase former. From this grain pattern, it is clear that $Al_3Sc$ crystallite 10 is finely dispersed as stable, spherical precipitations in the aluminium matrix. This finely dispersed pattern structure is made possible due to the coherence of the $Al_3Sc$ crystallite 10 relative to the aluminium matrix. In conjunction, the capacity for displacement perpendicular to the slide planes and the re-crystallisation behaviour can be reduced by increasing the re-crystallisation temperature. Furthermore, coalescence of the sub-grains is prevented as far as possible. In comparison with conventional refiners such as Ti, Zr, Mn, etc., for example, the Al—Sc dispersoids are capable of absorbing a greater volume fraction due to their improved solubility.

As a result of this fine distribution of the $Al_3Sc$ crystallite 10, it is also possible that micro-tears which occur within the Al—Sc alloy "run dead" on these $Al_3Sc$ crystallites, thereby producing improved mechanical properties. Due to the heterogeneous seed formation, caused by the high temperature of the Al—$Al_3Sc$ eutectics, susceptibility to hot tearing can be reduced, for example, and, in addition, the weldability of alloys of this type can be improved so that a better bond is possible between the individual layers of the multi-layered material. The larger volume fraction of the Sc is an important factor in preventing re-crystallisation and protects against annihilation of the sub-grains. The high coherence can also prevent displacement of the grain boundaries, thereby enabling a finer grain pattern to be achieved.

Re-crystallisation temperatures of up to 600° C. can be achieved if a quantity of Sc is incorporated. By comparison, aluminium alloys containing manganese (325° C.), chromium (325° C.) or zirconium (400° C.) have significantly lower re-crystallisation temperatures. The advantage which can be achieved by this feature is the improved capacity to process alloys of this type, i.e. processing can take place at higher temperatures without having to make allowance for any reduction in mechanical strength to speak of due to re-crystallisation. Re-crystallisation is caused, for example, by the fact that a cold formed metal, such as a rolled metal, is in a forced state and when heat is applied to the metal, e.g. when friction bearings are used in motors with shafts rotating at high speeds for example, tries to break down the deformation stress and repair disruptions in the lattice. This would be associated with a significant reduction in the mechanical properties, for example the hardness of these alloys, and would therefore significantly reduce the service life of friction bearings 2, for example, i.e. the periods between maintenance and hence the maintenance costs would be increased by a significant factor.

Over-ageing of alloys of this type can be improved due to the thermal stability of $Al_3Sc$ crystallite 10.

The intermediate layer 5 proposed by the invention for the $Al_3Sc$ crystallite 10 may be of a grain size in the region of between 0.005 $\mu$m and 5 $\mu$m, preferably between 0.1 $\mu$m and 1 $\mu$m.

The density of the Al—Sc alloy may be in the range of between 1.5 g/cm$^3$ and 7 g/cm$^3$ and may be approximately 3 g/cm$^3$, for example.

As already mentioned, Sc may be replaced at least partially by a series of other metals. As a result, not only is it possible to control the costs inherent in the manufacture of the aluminium alloy 4, it is also possible to make adjustments so as to select the properties of the aluminium alloy 4.

Elements which may be considered as substitute elements for Sc are those which are able to form inter-metallic bonds with aluminium, similar to $Al_3Sc$. As a result, it will in turn be possible to precipitate these inter-metallic bonds from the so-called "solid solution" in aluminium and these precipitations will have a positive effect on the strength of the Al matrix.

As a III A element, Sc has chemical similarities to Y, the lanthanides and specific transition elements (rare earths). Similarly to scandium, Y, Dy, Ho, Er, Yb and Lu, for example, form $Al_3Sc$ crystallite and these phases are partially isotypical of the $Cu_3Au$ type. Furthermore, as stated in U.S. Pat. No. 4,874,440 A, the lattice parameter of the cubic primitive unit cell for these precipitations is of a value which more or less corresponds to that of $Al_3Sc$. At the same time, the differences relative to the cubic face-centred lattice of the Al matrix are not that significant, which means that coherent phases can occur embedded in the aluminium matrix. Clearly, the Sc might not be fully replaced by said elements and instead combined crystals of the $Al_3M_{1-x}M'_x$ type formed.

If the difference in electron negativity between aluminium and the above-mentioned lanthanide elements or their metal radii are also compared, it would be conceivable and is indeed possible to replace the Sc at least partially by these elements or it would be possible for all metals to form ternary, quaternary or even higher combined crystal series with one another.

Details to this effect are to be found, for example, in the article entitled "Exploratory alloy development in the system Al—Sc—X" (Ralph R. Sawtell and J. W. Morris, Jr.; Dispersion Strengthened Aluminium Alloys; Edited by Y.-W. Kim and W. M. Griffith; The Minerals, Metals & Material Society, 1988; P. 409–420).

Elements from the actinide group may also behave in a similar way.

Although transition elements such as Hf, Nb, Ta, La are significantly larger than Sc, they may nevertheless exhibit behaviour similar to Sc in aluminium alloys, which can be attributed to elastic effects.

Transition elements typically crystallise in structure types other than the above-mentioned $Cu_3Au$ type, for example in the cubic $Mg_2Cu$ type, of a Laves phase or the orthorhombic AlDy type. However, combined crystal formations would also be conceivable and the properties could be adjusted by adding transition elements, thereby increasing the strength, for example, as a result. This being the case, the transition elements may be almost entirely absorbed in the $A_3M$ phases, which may increase the strength of Al—Sc alloys, for example.

Clearly, it would also be possible to crystallise the elements of lanthanides in other types of structure, as is the case with the $Al_3Dy$ type mentioned above, for example, although an important factor in producing coherent phases appears to be that the lattice constants of these $A_3M$ phases must have a value more or less the same as that of the lattice constants of cubic face-centred aluminium.

In addition to the elements mentioned above, however, the Li and Zr elements may also form phases of the $A_3M$ type in the aluminium matrix. Lithium may be used to avoid producing a significant increase in the density of the aluminium alloy. Moreover, it would be possible to vary, in particular increase, the E-modulus of the Al—Sc alloy by adding lithium.

As established in the article entitled "Influence of the particle size recrystallization and grain growth in Al—Mg—X alloys" (J. S. Vetrano, S. M. Beuemmer, L. M. Pawlowski, I. M. Robertson; Materials, Science and Engineering A 238; 1997; 101 ff), zirconium may be substituted for scandium in a quantity of up to 50%-atom. More heat-resistant precipitations can be produced, the size of this crystallite being largely independent of the homogenisation temperature after casting, for example, and may lie within the range of between 50 nm and 150 nm. $Al_3(Zr, Sc)$ precipitations of this type may prevent recrystallisation almost up to the melting point of the aluminium alloy 4, which means that the capacity of alloys of this type to withstand high temperatures and hence the resultant multi-layered material can be improved.

By adding Zn, however, it is also possible to modify the form of resultant primary aluminides, for example Mn-, Fe-, Cr-aluminides, etc., for example from the needle shape to spherical shapes. As a result, alloys of this type are also able to withstand higher temperatures since aluminides of a rounded shape form fewer recrystallisation seeds of a rounded shape than of a needle shape and the recrystallisation behaviour of alloys of this type can be optimised due to the cooperation of Sc and Zr.

In addition to the metals mentioned above, however, there is a whole series of other elements which may be added, the explanation below attempting to give a general outline of how these affect the respective alloys.

Cu, Mg, Si and Zn are absorbed by aluminium in solid solution, which may result in the occurrence of aluminium-rich mixed crystals. Cu or Cu and Mg, together with Al for example, form what are known as thermo-settable Kent alloys, which can be readily formed and rolled. Cu also has the effect of strengthening the matrix due to hardening of the mixed crystals. More information on this aspect can be found in the conference report entitled "The effect of Scandium on the age-hardening behaviour of an Al—Cu alloy" (The fourth international conference on aluminium alloys; M. Nakayama, Y. Miura, P. 538 ff; 1994). $Al_2Cu$ and $Al_3Sc$ crystallite 10 precipitate independently of one another, thereby avoiding any heterogeneous seed formation. However, precipitation of these crystallites commences almost simultaneously.

At this stage, it should be pointed out that the precipitation of $A_3M$ phases, in particular $Al_3Sc$, usually commences prior to the precipitation of aluminides of other types and these precipitations can therefore form a crystal seed for the latterly mentioned aluminides. However, as a result of this early precipitation, it is also possible to distribute $Al_3Sc$ crystallite 10 or corresponding precipitates in a fine dispersion in the aluminium matrix, especially if the $A_3M$ phases do not grow any further after the initial formation of seed but form a plurality of individual crystal seeds.

$Al_3Sc$ crystallites 10 may grow to a size of 10 nm and as a result remain finely and almost uniformly dispersed. Consequently, as mentioned above, over-ageing of these alloys can be largely prevented (see, for example, "The ageing behaviour and tensile properties of Al—Sc alloy"; The third International Conference on Aluminium Alloys; T. Tan, Z. Zheng, B. Wang, Page 290 ff; 1992) and the thermal stability increased. $Al_3Sc$ crystallites 10 usually only grow to 100 nm if they are not dissolved during solution annealing.

Adding Mg alone to alloys of this type does not normally impart hardening capacity.

Si and Mg may form an inter-metallic compound $Mg_2Si$, which is also soluble in the aluminium matrix depending on temperature and can lead to alloys capable of hardening. Al—Si mixed crystals can increase strength. When adding Mg, however, care should be taken to ensure that the respective proportion by weight is not too high, which would cause $Al_3Mg_2$ phases to precipitate at the different grain boundaries, which can lead to inter-crystalline corrosion.

Due to the precipitation of $Al_7Cr$, Cr may help to produce finer gains as well as Zr. Cr is barely soluble in Al and the creep resistance is enhanced due to precipitation of $Al_7Cr$. As a result, the hardness and strength of aluminium alloys 4 of this type at high temperature can be improved. Furthermore, iron may be bonded due to $Al_7Cr$, thereby preventing a precipitation of $Al_3Fe$ needles. Needle formation of this type affects the mechanical properties of Al alloys and under certain circumstances can lead to embrittlement.

However, in combination with Mn, Fe forms aluminides which help to impart strength at higher temperatures.

Co is also insoluble in Al but can increase creep resistance due to the precipitation of $Al_9Co_2$ and also bond Fe.

Cu may increase the tensile strength of the aluminium to a large degree. Alloys containing large amounts of copper, for example, may be hardened by quenching at almost 555° C.

Like Co and Fe, Ni is insoluble in Al but can increase creep resistance and strength at higher temperatures as with Co for example, due to precipitations of $Al_3Ni$.

Like Zr, the elements Cr, Hf, Ti, V and Mn may be added to Al alloys in order to produce a finer grain, in particular to control the grain structure.

Added Mn has a solidifying effect and improves resistance to corrosion, which means that the recrystallisation temperature can be increased accordingly. Furthermore, as mentioned above, especially with a small Fe content, the formation of long-spiked brittle $Al_3Fe$ needles can be prevented as the iron is absorbed by the more favourably shaped $Al_6Mn$ crystals.

Using the elements Sn, Sb, Pb and Bi, the so-called soft-phase formers, the properties of the aluminium alloy 4 can be adjusted so as to impart to it the specific properties of a bearing material if used as an anti-friction layer 3 of a friction bearing 2, for example gliding properties, ductility, embedding capacity for foreign particles, etc.

The hardening capacity of Al alloys can be varied with the aid of Ag, Au, Pd and Pt and Al-Ag alloys can be hardened by precipitation of the $AlAg_2$ equilibrium phase, for example.

The elements W, Ta, Re, Mo, Nb and Ca can also have a positive effect on the plastic properties, in particular the deformability, of Al alloys of this type.

Be, particularly in multi-element alloys, improves the fine grain structure of the precipitations from over-saturated solid solution phases.

The elements In, Ge and Te can be used to vary the properties of the aluminium alloy 4 still further so that the anti-friction properties of the anti-friction layer 3 can be improved.

Although the embodiments described below to illustrate the use of this aluminium alloy 4 relate exclusively to friction-type bearings 2, this use of the aluminium alloy 4 is not intended to be restrictive and it would be conceivable to use the aluminium alloy 4 in a whole series of different embodiments and applications, for example by dispensing with a supporting layer 6 or replacing the supporting layer 6 with other materials to produce thrust washers or thrust rings, as well as for all known embodiments of friction-type bearings subjected to radial and/or axial load.

Apart from aluminium (Al) with impurities inherent in the melt, the aluminium alloy 4 also contains soft-phase formers, e.g. tin (Sn), lead (Pb), bismuth (Bi), antimony (Sb) or similar. Moreover, the aluminium alloy 4 and hence the multi-layered materials made therefrom such as friction bearings 2 for example, may also contain other added quantities, as outlined above, so that the aluminium alloy 4 and the multi-layered materials made therefrom will also be capable of withstanding higher temperatures, such as predominantly required for the new types of bearing members for use with high-speed rotary shafts. The proportion of soft-phase formers may be up to 50% by weight, preferably between 14% by weight and 28.5% by weight relative to 100% by weight of the alloy.

It is of advantage that, after heat treatment for a period of from 0.5 to 48 hours at a temperature in the range of between 85° C. and 445° C., the aluminium alloy 4 can have a hardness whose value is not more than 35% below the hardness value measured prior to heat treatment after massive forming, e.g. rolling, forging, extrusion moulding or similar. In particular, the hardness value may be between 70 and 80% of the hardness value as measured before heat treatment after massive forming, in which case heat treatment may be applied for a period of from 1 to 24 hours and at a temperature in the range of between 100° C. and 350° C.

As already explained, the aluminium alloy 4 proposed by the invention may be made from multilayered materials, these multi-layered materials consisting of at least two layers of differing composition and in particular used as friction bearings 2. The hardness of the individual layers of the multi-layered material should be different and in particular should increase starting from a first peripheral layer to a second peripheral layer arranged opposite it. At least one of these peripheral layers may be made from the aluminium alloy 4 proposed by the invention and will be provided as an anti-friction layer 3 for said friction bearing 2 in particular, because of the high proportion of soft-phase formers.

The second peripheral layer may be provided as a supporting layer 6 and may be made from steel, for example.

Figure 3:
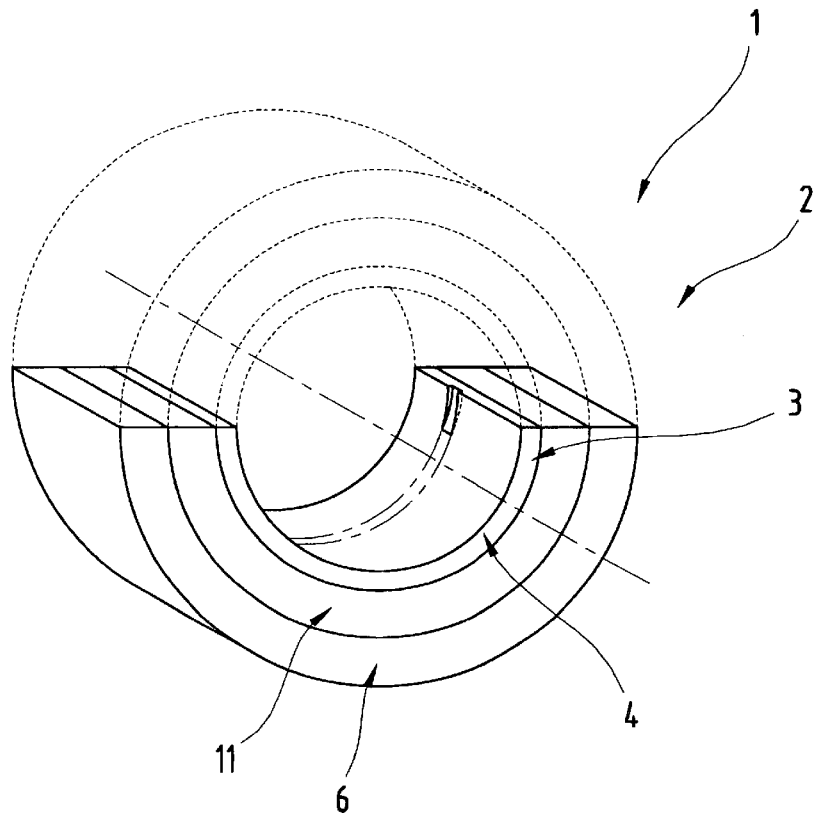
FIG. 3 is an embodiment of a friction bearing proposed by the invention with a three-layered structure.

FIG. 3 illustrates another bearing member 1 with a supporting layer 6 and an anti-friction layer 3, an intermediate layer 11, which might optionally be referred to as a middle layer or binding layer, being disposed between the supporting layer 6 and the anti-friction layer 3. Because of the selected alloying elements, the anti-friction layer 3 joined to this intermediate layer 11 to prevent displacement in this embodiment is a multi-layered material whose properties have a decisive effect on the properties sought for the bearing member 1. The intermediate layer 11 may be made from pure aluminium, for example, optionally with impurities resulting from melting, or an aluminium alloy containing an element from the group consisting of Fe, Mn, Ni, Cr, Co, Cu, Pt, Mg, Sb or Ag as its main alloying elements, or an Al—Zn 4.5 alloy or an aluminium alloy in which at least one of the elements listed, such as Sc or similar is incorporated in the alloy and which optionally contains no soft-phase formers such as Sn, Pb, Bi, Sb or similar, for example.

Clearly, it would also be possible for at least one other intermediate layer to be provided between the first and second peripheral layer, in other words the anti-friction layer 3 and the supporting layer 6.

Furthermore, the intermediate layer 11 may have a Vickers hardness in the range of between 55 HV2 and 100 HV2, preferably between 60 HV2 and 85 HV2.

Both the anti-friction layer 3 and the intermediate layer 11 may be thermo-settable. The strength of the intermediate layer 11 should be at least the same as but preferably higher than the strength of the anti-friction layer 3. In particular, the hardness value of the intermediate layer 11 is somewhere between the hardness value of the anti-friction layer 3 and that of the supporting layer 6. If several intermediate layers are provided between the two peripheral layers, it is of advantage if the hardness increases in steps from the first peripheral layer in the direction of the second peripheral layer, in other words from the anti-friction layer 3 to the supporting layer 6.

In order to demonstrate the properties of the layered material proposed by the invention, in other words the aluminium alloy 4, a layered material of this type was compared with a conventional material used for a friction bearing. The layered material used for this purpose was an aluminium alloy 4 with a scandium content of 0.15% by weight, a manganese content of 0.4% by weight and a tin content of 25% by weight, the rest being aluminium with impurities due to melting.

As explained above, because of the large number of possible alloys which can be produced by the very different possible combinations of elements, this example is given by way of illustration only. However, this does not mean that the invention is limited to this example only and in fact all possible combinations of elements for the aluminium alloy 4 fall within the scope of the invention.

The aluminium alloy 4 was cast in a rectangular format by means of a vertical extrusion die. The skin of the cast was then milled on all sides. The resultant strip was rolled in several layers to a thickness of approximately 10.3 mm. After a planishing roll process, the surface was roughened and rolled together with a pure aluminium sheet approximately 1 mm thick on both sides.

This layered material was then rolled in five steps to a thickness of 1.75 mm and then rolled together with a planished, degreased and surface-roughened sheet steel. This produced on the multi-layered material comprising steel-pure aluminium-AlSc 0.15, Mn 0.4, Sn 25-pure aluminium a total layer thickness of 0.98 mm. The joins were then heat treated for 3.5 hours at a temperature of 345° C.

Bearing shells were then made from this strip of multi-layered material in the usual manner (blanks punched, blanks pressed, pure aluminium covering sheet cut, precision machining, etc.).

During the production process, the heat release needed for hardening may be between 2.5 J/s and 4.3 J/s depending on the selected venting conditions.

Clearly, it would also be possible to use a horizontal extrusion die rather than the vertical extrusion die or different methods might be used for the manufacturing process as will be described in more detail below.

The multi-layered material made in this way was compared with a standard material used for a friction bearing 2 consisting, in addition to aluminium as the main alloying element, of 20% by weight Sn, 0.9% by weight Cu and the other impurities usually contained in aluminium.

By contrast with the alloy used for comparison purposes, the tin network of the aluminium alloy 4 proposed by the invention and used for the anti-friction layer 3 was in an essentially discontinuous form so that although the alloy proposed by the invention had a markedly higher tin content it nevertheless exhibited higher strength in terms of structure. Accordingly, an increase of at least five points was found when the Brinell hardness was measured in the cast state.

The essentially discontinuous tin network is illustrated by the hatched areas of the diagram given in FIG. 2. The tin network may be interrupted by solid particles 12 which may be formed from a part of the above-mentioned elements, these solid particles 12 preferably having rounded surfaces so that shearing is reduced.

To test for deformability, the comparative material was put through the same treatment as the aluminium alloy 4.

It was found that for roll forming without intermediate annealing, the conventional material was capable of a deformation of 25% maximum in a single pass, at which point initial tears had already begun to show, producing strips which could no longer be reused at a pass reduction up to 35%.

In the case of the bearing material proposed by the invention, initial tearing was not observed until a deformation of 40% overall was reached, but these tears grew considerably more slowly as the pass thickness increased so that with a pass reduction of 50%, the strip could be used without any problem except for a narrow peripheral region.

Another forming test consisted in testing the number of rolling operations performed one after the other without intermediate annealing and with a constant pass reduction of 5% respectively. With the conventional material, the deformation had to be adjusted after 8 to 19 passes. This corresponds to a maximum total deformation of just over 40%. From the hardness measurements taken on the rolled surface after each pass, it was observed that the comparative alloy had already reached a maximum hardness after 6 passes. During subsequent passes, a partial reduction in hardness was even observed, which can be attributed to structural damage.

With the bearing material proposed by the invention, on the other hand, the measurements high-lighted a particularly steep increase in the hardness up to the 11th roll pass. After that, the hardness stopped to a degree that it was not measurable. With a corresponding total deformation of from 48% to 53%, further deformation was no longer possible due to tearing.

Figure 4:
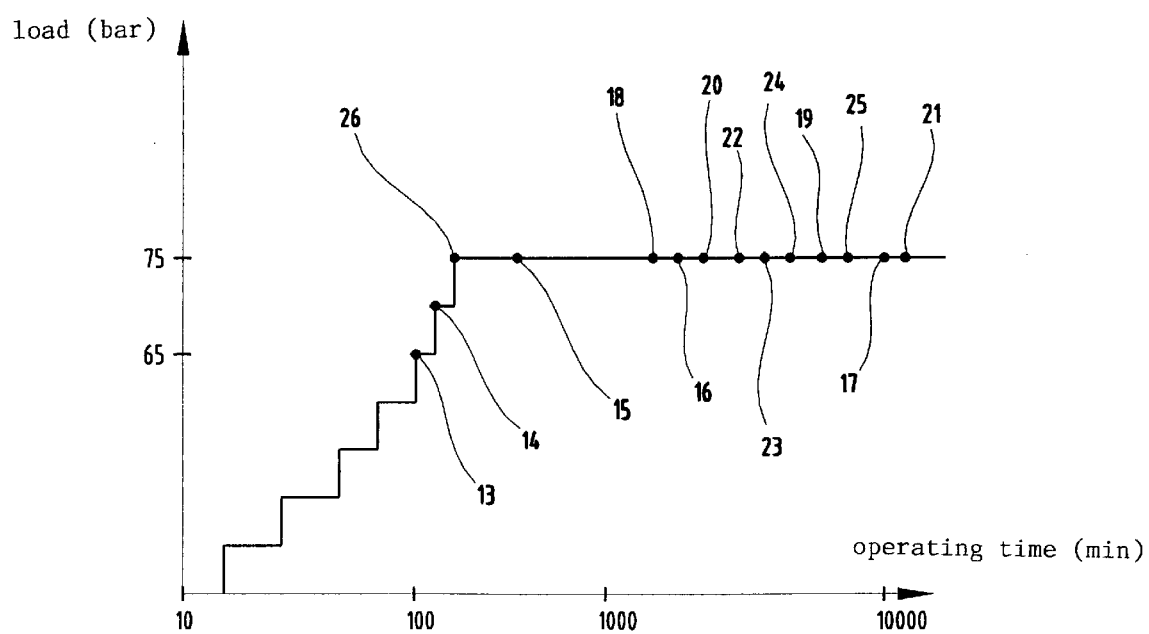
FIG. 4 is a graph showing the bearing behaviour during service of friction bearings with anti-friction and intermediate layers of different aluminium alloys plated on a layer of steel as the bearing load changes over a period of time.

The graph in FIG. 4 gives a logarithmic scale with the load in bar plotted on the ordinate and the operating time in minutes plotted on the abscissa.

It is known that the load on a bearing member 1, in particular stress due to temperature and/or pressure, during what is referred to as a run-in phase as well as afterwards will bring about a change in strength, the strength being dependent on the constituent elements of the alloy. Depending on this run-in time and the time taken to reach specific threshold values, no further significant changes in strength will occur throughout the service life, which ends when a bearing of this type becomes unusable due to material fatigue.

The layered structure proposed by the invention and the effect it has on the behaviour of the bearing will be described in more detail below with reference to specific examples of different layer structures used for friction bearings 2 of this type.

EXAMPLE 1

The supporting layer 6 of this friction bearing 2 is made from a steel and the anti-friction layer 3 is made from an aluminium alloy, in particular from AlZn 4.5, joined to the supporting layer 6 so as to be prevented from displacement.

EXAMPLE 2

The supporting layer 6 of this friction bearing 2 is made from a steel. On top of the supporting layer 6 is an intermediate layer 11 made from pure aluminium and on top of it the anti-friction layer 3 made from an aluminium-Sn alloy, e.g. AlSn6Cu or AlSn20Cu.

EXAMPLE 3

In this friction bearing 2, the supporting layer 6 is made from a steel. On top of the supporting layer 6 is the intermediate layer 11 made from a CuPb alloy and on top of it the anti-friction layer 3 made from AlSn20.

EXAMPLE 4

The supporting layer 6 of this friction bearing 2 is made from steel. In a first embodiment, arranged on top of this supporting layer 6 of steel is an intermediate layer 11 of pure aluminium and it is in turn joined to an anti-friction layer 3 proposed by the invention containing, in addition to Al, 0.15% by weight Sc, 0.4% by weight Mn and 25% by weight Sn.

EXAMPLE 5

This embodiment of a friction bearing 2 also has a supporting layer 6 made from steel. Rolled on top of an intermediate layer 11 of pure aluminium is an anti-friction layer 3 made from an aluminium alloy 4 comprising 0.2% by weight Zr and 25% by weight Sn (AlZrSn 25).

EXAMPLE 6

This example of a friction bearing 2 is intended to demonstrate the way in which Sc and Zr co-operate with one another. The anti-friction layer 3 is made from an aluminium alloy 4 having 0.15% by weight Sc, 0.4% by weight Mn, 25% by weight Sn and 0.1% by weight Zr. This alloy may be bonded on top of an aluminium intermediate layer 11 and on an intermediate layer 11 of an AlSc alloy with a supporting layer of steel.

EXAMPLE 7

This example is intended to demonstrate the effect which the quantity of soft-phase formers has. The anti-friction layer 3 is an aluminium alloy consisting of 1.3% by weight Sc and only 6% by weight Sn. This anti-friction layer 3 is in turn disposed on an aluminium intermediate layer 11 with the supporting layer 6 being made from steel.

Clearly, the intermediate layer 11 of pure aluminium can be replaced by an intermediate layer 11 of an AlSc alloy in all the examples described above.

In order to test the bearing service behaviour of a friction bearing 2 and classify it into categories of use, service behaviour for bearing purposes can be tested and monitored using predefined test methods. In order to simulate changes in stress, a shaft rotating at a predefined rotation speed for the cylinder size used, likely to causes stress to the bearing housing, can be operated at a hydraulic pressure of 75 bar. Once the maximum bearing load is reached, the test is continued until the bearing becomes so damaged due to compression of the anti-friction layer 3 or burring in the region of the anti-friction and intermediate layers 3, 11 or due to friction that it has to be replaced. Details incorporated in the definition as to the point from which this damage is so severe that the bearing can no longer be used are established prior to every individual test series.

The graph illustrates service behaviour in a bearing application of the embodiments of the individual friction bearings 2 given as examples 1 to 7 above.

As may be seen from the graph, showing for example a simple bearing structure of the type described in example 1, known from the prior art, this type of friction bearing 2 fails even before reaching maximum load denoted by time 13—as shown in the graph—due to friction at the bearing point.

Better service behaviour is already in evidence in the case of another embodiment of a friction bearing 2, also known from the prior art, having a triple-layered structure, in which the supporting layer 6 is made from steel, the intermediate layer 11 from pure aluminium and the anti-friction layer 3 from aluminium alloys incorporating tin—as detailed in example 2.

Whilst the aluminium alloy with a lower tin content also fails even before reaching maximum load at time 14, the more highly alloyed aluminium remains resistant over a longer period of maximum load up to a time 15 before the bearing is crushed or up to a time 16 when the bearing is worn.

As known from the prior art, very high service periods for bearings can be achieved with a bearing structure as outlined in example 3, since a friction bearing 2 of this type does not fail until after a period of approximately 10,000 minutes, in other words at time 17.

Bearings of this type which proved capable of a long service life in this comparative test are also referred to as "passed components".

The times 18, 22 and 19, 21 show the test results for a bearing structure—as outlined in example 4—in which the intermediate layer 11 is made from pure aluminium and the anti-friction layer 3 is made from the aluminium alloy 4 proposed by the invention. Compared with the bearing embodiment described in example 2, there was a significant increase in the service life. At time 18, a bearing of the steel/aluminium/AlScSn25 structure exhibited crushing and at time 19 a friction bearing 2 of the steel/AlSc alloy/AlScSn25 alloy structure exhibited crushing.

Another feasible embodiment is one in which the intermediate layer 11 contains zinc as the main alloying element and the anti-friction layer 3 contains tin as the main alloying element.

In another test, an intermediate layer 11 of AlZn 4.5 was applied on top of the supporting layer 6 of steel and an anti-friction layer 3 made from AlSn20Cu on top of it. A friction bearing 2 of this type was shown to operate reliably up to the time 20.

However, the best result was obtained with a bearing structure in which the supporting layer 6 is again made from steel and the intermediate layer 11 from Al—Sc alloy, it being possible to replace the Sc at least partially with Y, Hf, Mg, Ta, La, by an element selected from the lanthanides or the actinides, or which may contain the other alloying elements, such as Li, Zn, Si, Mg, Mn, Cu, Be, Ca, Zr, Mo, W, Ag, Ti, V, Cr, Fe, Co, Ni, Pd, Au, Pt, In, Ge, Sn, Pb, Sb, Bi, Te, and which consists in particular of AlMn 0.5 Sc 0.15, to which an anti-friction layer 3 made from the aluminium alloy 4 proposed by the invention is applied as detailed in example 4.

What came as a surprise to the skilled person, however, was the fact that, this combination, in which the intermediate layer 11 is alloyed at least with Sc and is used in conjunction with the anti-friction layer 3 proposed by the invention, also came out as a "passed component"—plotted at time 21 on the graph—even though it is of a simpler and hence cheaper bearing structure—in terms of manufacturing methods—than the bearing structure described in example 3, the time 21 reached indicating that a friction bearing 2 of this structure will not exhibit signs of friction until after a running time of approximately 10,000 minutes, after which it fails, e.g. has to be replaced by a new friction bearing 2.

Very good results in terms of running time were also obtained with a friction bearing 2 of the structure steel/ASc/AlSn20, which exhibit crushing at time 22 and did not fail until after a period of service corresponding to time 23.

However, a friction bearing 2 with the structure steel/Al/AlScSn25, in other words a friction bearing 2 having the aluminium alloy 4 proposed by the invention as its anti-friction layer 3, did not become worn until time 22. This again specifically demonstrates the importance of matching the multi-layered material in view of the fact that the intermediate layer 11, in other words the joining layer, also fulfils a specific function, as is particularly reflected by the fact of having reached time 21, which, as explained above, represents the failure time of a friction bearing 2 for which the same aluminium alloy 4 proposed by the invention is used as the anti-friction layer 3 along with a supporting steel layer, albeit the intermediate layer 11 was replaced by an Al—Sc alloy (St/AlSc/AlScSn25).

The times 24 and 25 indicate the breaking point or failure of a friction bearing 2, made from a supporting layer 6 of steel, an intermediate layer 11 of an Al—Sc alloy and an anti-friction layer 3 of an aluminium-tin alloy, which may contain up to 32% by weight of tin, in which the tin network occurring due to the high proportion of tin is interrupted by hard materials consisting of at least one element from the group of elements consisting of Fe, Mn, Ni, Cr, Cu, Pt, Mg, Sb, W, Nb, V, Ag, Mo or Zr, these hard materials being of a more or less spherical or cubic shape and occurring due to the formation of inter-metallic phases, e.g. the formation of aluminide. For the times 24, 25, an example was selected which contains 22.1% by weight Sn, 1.44% by weight Cu, 0.47% by weight Mn, 0.24% by weight Fe, 0.08% by weight Cr and 0.5% by weight Mg, the remainder being aluminium plus impurities in the alloy.

A totally poor result was achieved with a friction bearing 2 of the type detailed in example 7, plotted at time 26 in FIG. 4. Although this friction bearing 2 reached the maximum load of 75 bar, it nevertheless failed due to wear on attaining this maximum load because the proportion of Sn in the anti-friction layer 3 is too low.

A friction bearing 2 with an anti-friction layer 3 of the type outlined in example 5 also fails to achieve the values attained by a friction bearing 2 containing comparable quantities of scandium instead of zircon. As illustrated in FIG. 4, this type of friction bearing 2 detailed in example 5 also reaches the above-mentioned times 15, 16 for breaking point or failure of the friction bearing 2. This example therefore also demonstrates that incorporating scandium in aluminium-tin alloys has a significant effect on the properties of the friction bearing 2 and moreover that Sc can not be totally replaced by Zr.

By contrast, however, it may be meaningful to replace the scandium at least partially with zircon, particularly with regard to the cost of manufacturing such friction bearings 2, as is evident from the times 18, 19, 21, 22 plotted in FIG. 4. These times are also applicable to a friction bearing 2 of the type detailed in example 6 using the aluminium alloy proposed by the invention containing Sc and Zr in more or less comparable proportionate quantities. Times 18, 22 show the breaking point or failure of a friction bearing 2 of the type defined in example 6 having an intermediate layer 11 of pure aluminium, whilst the times 19, 21 denote this friction bearing 2 having an intermediate layer 11 made from an AlSc alloy. It is therefore clear that replacing the intermediate layer 11 of pure aluminium with an intermediate layer 11 of an AlSc alloy has a not inconsiderable effect on the service behaviour of a friction bearing of this type.

Finally, time 22 also represents the breaking point of a friction bearing 2 defined in example 5 and time 23 the failure of this friction bearing 2, where again the intermediate layer 11 is made from an AlSc alloy, thereby demonstrating the influence of the intermediate layer 11 on the properties of the friction bearing since the same friction bearing 2 defined in example 5 but with an intermediate layer 11 of aluminium already fails or reaches break point by times 15, 16.

The upshot of all this is that, on the one hand, a friction bearing 2 having the aluminium alloy 4 proposed by the invention as its anti-friction layer 3, an AlScSn25 alloy for example, exhibits very good service behaviour, which is no mean feat in comparison with the so-called "Hi-Tech" friction bearings 2 defined in example 3, and, on the other hand, friction bearings 2 can also be manufactured cost-effectively if the aluminium alloy 4 proposed by the invention is used for the anti-friction layer 3 and pure aluminium for an intermediate layer 11, such friction bearings 2 producing results in terms of bearing service behaviour which make them suitable for various applications.

Figure 5:
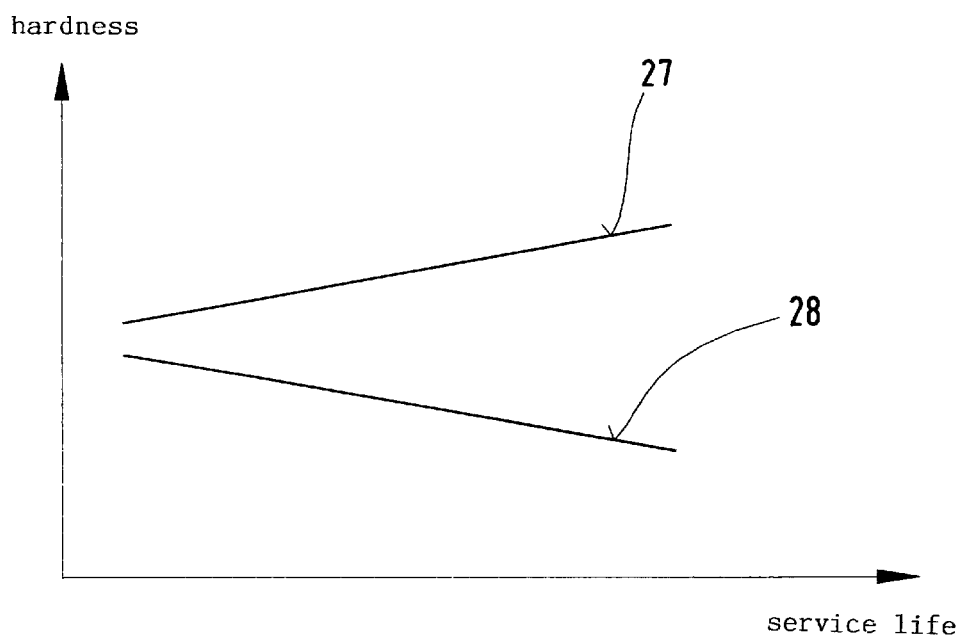
FIG. 5 is a graph plotting the hardness in the individual layers of a friction bearing during the service life.
Figure 6:
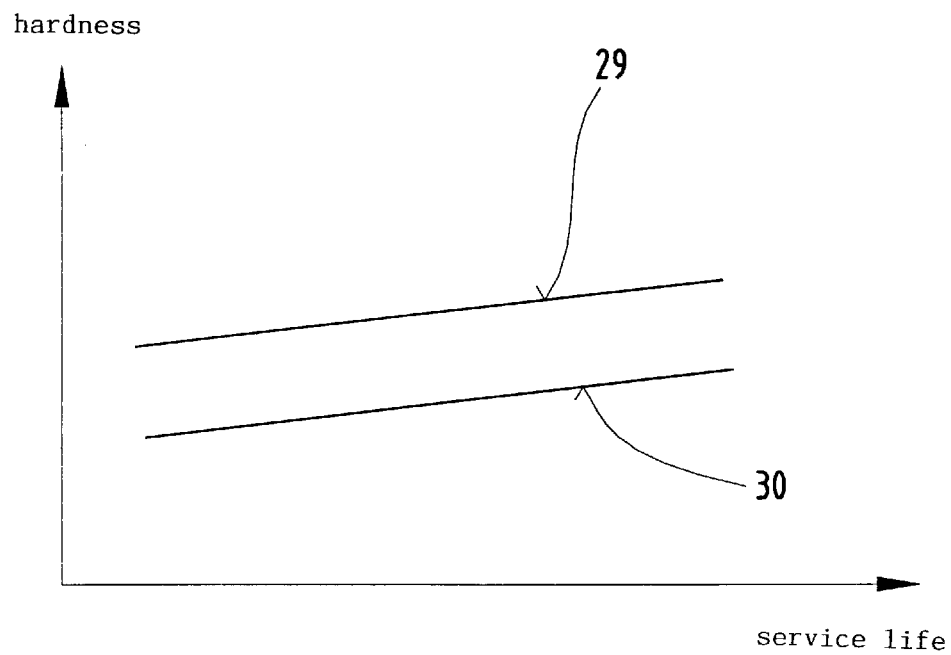
FIG. 6 is a graph similar to that of FIG. 5 relating to a friction bearing having the layers proposed by the invention.

FIGS. 5 and 6 are graphs illustrating the changes in hardness during the service life of a friction bearing 2, changes in hardness essentially being dependent on the different combination of anti-friction layer 3 and intermediate layer 11.

Since the supporting layer 6 is always the same, being made from steel, it will not be taken into account for the purposes of this analysis since the hardness of this steel layer has barely any effect on service life.

Rather, the key factor here is the differing hardness produced depending on the alloy of the anti-friction and intermediate layers 3 and 11.

To obtain long, durable, fault-free operation and a long service life, it is of advantage if the hardness in the intermediate layer 11 and the anti-friction layer 3 changes in a more or less similar manner, i.e. only slight differences between 0% and 20% occur in the changing hardness during service life. As illustrated in the graph of FIG. 5, the results which are deemed to be suitable for practical purposes are those obtained if the aluminium alloy 4 proposed by the invention, containing a high proportion of tin, is used for the anti-friction layer 3 and pure aluminium is used for the intermediate layer 11. These embodiments demonstrate that the hardness of the aluminium alloy proposed by the invention increases during service life due to age-hardening whereas, as is already known from the prior art, pure aluminium loses the tensions that impart higher strength under the effect of heat and pressure, becoming softer over the course of service life. By appropriate selection to ensure that the hardness of the anti-friction layer 3 increases in proportion to the decrease in hardness of the intermediate layer 11, however, a positive overall result can still be achieved, making a long service life possible whilst maintaining the threshold values as the hardness changes.

The changes in increasing and decreasing hardness are illustrated in the graph of FIG. 5, for the anti-friction layer 3 by a diagrammatic line 27 and for the intermediate layer 11 by a diagrammatic line 28.

However, surprisingly to the skilled person, a layered structure will produce positive results in terms of changes in hardness over service life if, as illustrated in FIG. 6, the anti-friction layer 3 made from an aluminium alloy 4 proposed by the invention shown by the diagrammatic line 29 and the intermediate layer 11 shown by the diagrammatic line 30 are hardened and their hardness increases due to the effect of temperature over their operating life, whereby only slight or absolutely no differences occur in the changes in hardness during service life. This is achieved by the aluminium alloy 4 proposed by the invention in the anti-friction layer 3, alloyed with a high proportion of tin and containing additional alloying elements such as Sc, and by the aluminium alloy, also incorporating tin in the alloy, of the intermediate layer 11, which, as explained above, can be joined to one another by rolling and plating or by the supporting layer 6 made from steel.

At the same time, as may also be seen from the graph of FIG. 6, if the intermediate layer 11 is of a higher hardness, also illustrated by the bearing service behaviour plotted in FIG. 4, such a bearing will be capable of a higher downtime.

Multi-layered materials as proposed by the invention may be made using any appropriate method already known from the prior art. For example, the aluminium alloy for the intermediate layer 11 and/or the aluminium alloy 4 for the anti-friction layer 3 may be made from a continuous casting process, in which case blanks can be produced to a predetermined thickness. For example, in order to make these individual layers for the multi-layered material from these blanks, they can be rolled. The rolling process may be operated in several steps, whereby the thickness of the blank can be reduced by approximately 10% to 70% with each pass and this process is preferably continued until the wall thickness required for the layers is reached.

However, it would also be possible, particularly if making the multi-layered material proposed by the invention, to run the rolling process so that two or more different and/or same layers are laid one on top of the other and a firm join produced between the individual layers by rolling and plating. For example, the Al alloy 4 for the anti-friction layer 3 may be covered with the surface 5 having the Al alloy for the intermediate layer 11, in other words an Al—Sc alloy for example, and the surface of the anti-friction layer 3 lying opposite the surface 5 covered with a sheet of pure aluminium. The purpose of the latter, particularly when subsequently annealing the resultant layer joint, is to prevent the soft phases which might normally have a melting temperature below or close to the annealing temperature from precipitating out of the aluminium matrix of the bearing alloy, in which case they would be lost. In order to impart to this join the mechanical strength that will be required for applications as a friction bearing 2, the supporting layer 6, for example steel, can be applied to the joint in a subsequent step by another rolling process and therefore also joined. After a subsequent further temperature treatment of the multi-layered material, which may now comprise three layers for example, it is brought to its final shape, which might be a half-shell as illustrated in FIGS. 1 or 3, in a press. Finally, the aluminium layer used to prevent any loss of tin from the anti-friction layer 3 can be removed, for example by machining. Any appropriate final processes may then follow, such as milling the edges, forming the groove 7, etc.

The anti-friction layer 3 may be rolled with the Al base alloy of the intermediate layer 11, which may optionally contain other alloying elements or no soft-phase formers.

In addition to the methods mentioned above, a series of other processes may also be performed, such as a CVD process (Chemical Vapour Deposition), various vacuum coating techniques such as vapour deposition, ion plating, cathode sputtering, galvanic processing, dipping without current, spray coating techniques, etc. Furthermore, various other processing techniques may be used to finish the material, e.g. laser techniques.

In all the methods which may be used, the supporting layer 6 and/or the intermediate layer 11 and/or the anti-friction layer 3 may be selected as the initial material for the plating or coating process.

It goes without saying that any specific intermediate steps which might be needed can also be performed, such as de-greasing the surfaces, for example with solvents.

As mentioned above, the individual layers, in particular the Al alloys 4, may be subjected to heat treatment during the manufacturing process, in particular after a rolling process, in order to release the tensions induced by deformation. For example, it would be possible to subject the intermediate layer 11 and/or the anti-friction layer 3 to a heat treatment for 0.5 to 48 hours at a temperature of from 85° C. to 445° C., as a result of which, advantageously, the hardness value of the intermediate layers after this heat treatment would be no more than 35% below the hardness value of the intermediate layer 11 and/or the anti-friction layer 3 prior to massive forming, by rolling, forging, extrusion moulding or similar, for example. The hardness value for this intermediate layer 11 and/or the anti-friction layer 3 after massive forming may be in the region of between 70% and 80% of the hardness value as measured prior to heat treatment, for example.

The thickness of the individual layers may be in the region of between 0.3 mm and 0.6 mm, preferably 0.4 mm and 0.5 mm for the anti-friction layer 3, for example, in the range of between 0.05 mm and 0.2 mm, preferably between 0.1 mm and 0.18 mm for the intermediate layer 11 and in the range of between 0.8 mm and 1.8 mm, preferably between 1.0 mm and 1.5 mm for the supporting layer 6. Clearly, the individual thicknesses are given merely as examples since the overall thickness of the multi-layered material will depend in particular on the application for which it will be used and the thickness of the individual layers will therefore be adapted as a result.

The hardness of the anti-friction layer 3 may be in the range of between 26.0 HV2 and 120.0 HV2, preferably between 40.0 HV2 and 95.0 HV2, after plating for example, and after heat treatment in the range of between 25.0 HV2 and 85.0 HV2, preferably between 40.0 HV2 and 75.0 HV2, that of the intermediate layer 11 after plating in the range of between 55.0 UMHV20p and 100.0 UMVH20p, preferably between 60.0 UMHV20p and 85.0 UMHV20p and after heat treatment between 45.0 UMHV20p and 80.0 UMHV20p, preferably between 55.0 UMHV20p and 75.0 UMHV20p, and that of the supporting layer 6, made from steel for example, in the range of between 110.0 HV2 AND 260.0 HV2, preferably between 150.0 HV2 and 240.0 HV2 after plating and in the range of between 105.0 HV2 and 240.0 HV2, preferably between 145.0 HV2 and 235.0 HV2. UMHV20p means UltraMicroHardnessVickers20pond.

The heat treatment to obtain the values mentioned above can be applied for about three hours at approximately 350° C. However, tests conducted at higher temperatures, for example 350° C. to 400° C., showed no significant change in the hardness of the intermediate layer 11 and/or the anti-friction layer 3, which, as explained earlier, can be attributed to the fact that the recrystallisation temperature for Al—Sc alloys lies within the range of approximately 600° C.

Other measurements also showed that the hardness of the intermediate layer 11 and/or the anti-friction layer 3 both in the direction of extrusion and transversely to the extrusion direction were more or less the same, which can be explained by the finely dispersed distribution of the Al3Sc crystallite 10 across the entire volume of the Al alloys 4.

The al-based alloy(s) or the multi-layered material may be tempered after every overall forming process by at least 25% and at most 91% in one or more forming steps at a temperature in the range of between 85° C. and 445° C., preferably between 150° C. and 400° C.

Furthermore, by using a plating technique in a rolling mill, the thickness of the multi-layered material or the respective intermediate products can be reduced by between 20% and 75%, preferably between 25% and 50%, with each pass.

At this stage, it should be pointed out that all the compositions of Al alloys 4 given here are intended as examples only and were selected from a whole range of possible combinations. However, this does not mean that the invention is limited to these combinations of Al alloys 4 and in practice all possible combinations fall within the scope of the invention.

For the sake of good order, it should finally be pointed out that in order to provide a clearer understanding of the structure of the multi-layered material or aluminium alloy 4, it and its constituent parts have been illustrated out of scale to a certain extent and/or on an enlarged and/or reduced scale.

The tasks underlying the independent inventive solutions can be found in the description.

Above all, subject matter of the individual embodiments illustrated in FIGS. 1; 2; 3; 4; 5, 6 can be construed as independent solutions proposed by the invention. The related tasks and solutions can be found in the detailed descriptions of these drawings.

LIST OF REFERENCE NUMBERS

1 Bearing member
2 Friction bearing
3 Anti-friction layer
4 Aluminium alloy
5 Surface
6 Supporting layer
7 Groove
8 End face
9 Side walls
10 $Al_3Sc$ crystallite
11 Intermediate layer
12 Solid particle
13 Time
14 Time
15 Time
16 Time
17 Time
18 Time
19 Time
20 Time
21 Time
22 Time
23 Time
24 Time
25 Time
26 Time
27 Diagrammatic line
28 Diagrammatic line
29 Diagrammatic line
30 Diagrammatic line

What is claimed is:

1. Wrought aluminium alloy for a layer in a friction bearing which, apart from impurities inherent in the smelt, additionally contains Sn, Pb, Bi, Sb as soft-phase formers, and a quantity of at least one element from the group of elements consisting of Sc, Y, Hf, Ta, La, lanthanides and actinides up to a maximum of 10% by weight, said quantity forming intermetallic $A_3M$ phases with the aluminium, said $A_3M$ phases being an average diameter of 0.005 μm to 5 μm.

2. Aluminium alloy as claimed in claim 1, wherein the alloy contains between 0.015% by weight and 2.5% by weight of at least one element from said group of elements, relative to 100% by weight of alloy.

3. Aluminium alloy as claimed in claim 1, wherein the alloy contains between 0.015% and 1.0% by weight of at least one element from said group of elements, relative to 100% by weight of alloy.

4. Aluminium alloy as claimed in claim 1, wherein the alloy additionally contains at least one element from the group consisting of Li, Zn, Si, Mg, up to a maximum of 12% by weight, relative to 100 t by weight of alloy.

5. Aluminium alloy as claimed in claim 1, wherein the alloy additionally contains at least one element from the group consisting of Mn, Cu, Be, Ca, Zr, Mo, W, Ag, up to a maximum of 10% by weight, relative to 100% by weight alloy.

6. Aluminium alloy as claimed in claim 1, wherein the alloy additionally contains at least one element from the group consisting of Ti, V, Cr, Fe, Co, Ni, up to a maximum of 10% by weight, relative to 100% by weight of alloy.

7. Aluminium alloy as claimed in claim 1, wherein the alloy additionally contains at least one element from the group consisting of Pd, Au, Pt, In, Ge, Sn, Pb, Sb, Bi, Te, up to a maximum of 10% by weight.

8. Aluminium alloy an claimed in claim 1, wherein the proportion of soft-phase formers is up to 50.0% by weight, relative to 100% by weight of alloy.

9. Aluminium alloy as claimed in claim 1, wherein after a heat treatment for a period of 0.5 to 48 hours and at a temperature in the range of between 85° C. and 445° C., the alloy has a hardness whose value is not more than 35% below the hardness value as measured prior to the heat treatment after massive forming.

10. Aluminium alloy as claimed in claim 1, wherein after a teat treatment for a period of 1 to 24 hours and at a temperature in the range of between 100° C. and 350° C., the alloy has a hardness whose value is in the range of between 70% and 80% of the hardness value as measured prior to the heat treatment after massive forming.

11. Aluminium alloy as claimed in claim 1, wherein the alloy has a Vickers hardness in the range of between 26 HV2 and 120 HV2, prior to a heat treatment.

12. Multi-layered material for friction bearings, comprising at least two layers of differing composition, in which the hardness of the layers is different and increases from a first peripheral layer to a second peripheral layer lying opposite it, wherein at least one peripheral layer is made from an aluminium alloy as claimed in claim 1.

13. Multi-layered material as claimed in claim 12, wherein the first peripheral layer is provided as an anti-layer friction layer for a bearing.

14. Multi-layered material as claimed in claim 12, wherein the second peripheral layer is a supporting layer.

15. Multi-layered material as claimed in claim 14, wherein the supporting layer is made from steel.

16. Multi-layered material as claimed in claim 12, wherein at least one intermediate layer is disposed between the first and the second peripheral layer.

17. Multi-layered material as claimed in claim 16, wherein the intermediate layer is made from pure aluminium with smelt-related impurities.

18. Multi-layered material as claimed in claim 16, wherein the intermediate layer is an aluminium alloy containing at least one element from the group of elements consisting of Fe, Mn, Ni, Cr, Co, Cu, Pt, Mg, Sb or Ag as its main alloying element.

19. Multi-layered material as claimed in claim 16, wherein the intermediate layer is an aluminium alloy in which the main alloying element is Zn and is an Al-Zn 4.5 alloy.

20. Multi-layered material as claimed in claim 16, wherein the intermediate layer is an aluminium alloy.

21. Multi-layered material as claimed in claim 20, wherein the intermediate layer is an aluminium alloy without the addition of soft-phase formers.

22. Multi-layered material as claimed in claim 13, wherein the anti-friction layer has a Vickers hardness in the range of between 26 HV2 and 120 Hv2, prior to the heat treatment.

23. Multi-layered material as claimed in claim 16, wherein prior to the heat treatment, the intermediate layer has Vickers hardness in the range of between 55 UMHV20p and 100 UMHV20p.

24. A method of manufacturing a multi-layered material for a friction bearing as claimed in claim 12, wherein at least the first peripheral layer is joined to an intermediate supporting layer.

25. A method as claimed in claim 24, wherein the previously hardened first peripheral layer is rolled with at least one other Al base alloy, which may optionally contain other alloying elements or no soft-phase formers.

26. A method as claimed in claim 25, wherein the Al-based alloy(s) or multi-layered material is/are tempered after every overall forming process by at least 25% and at most 91% in one or more forming steps at a temperature in the range of between 85° C. and 445° C.

27. A method as claimed in claim 24, wherein an anti-friction layer is applied on top of the intermediate layer or the intermediate layer is applied on top of the anti-friction layer and/or the intermediate layer is applied on top of the supporting layer by a rolling process, a CVD process, a galvanic processing, cathode sputtering, a vacuum vapour deposition process.

28. A method as claimed in claim 24, wherein the thickness of the multi-layered material or the respective intermediate products is reduced by means of a plating process in a rolling mill in the range of 20% to 75%.

29. Aluminium alloy as claimed in claim 1, wherein the alloy contains between 0.015% by weight and 3.25% by weight of at least one element from said group of elements, relative to 100% by weight of the alloy.

* * * * *